(12) United States Patent
Khaloo et al.

(10) Patent No.: US 11,423,611 B2
(45) Date of Patent: Aug. 23, 2022

(54) TECHNIQUES FOR CREATING, ORGANIZING, INTEGRATING, AND USING GEOREFERENCED DATA STRUCTURES FOR CIVIL INFRASTRUCTURE ASSET MANAGEMENT

(71) Applicant: The Joan and Irwin Jacobs Technion-Cornell Institute, New York, NY (US)

(72) Inventors: Ali Khaloo, New York, NY (US); David Lattanzi, Fairfax, VA (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 0 days.

(21) Appl. No.: 17/321,829

(22) Filed: May 17, 2021

(65) Prior Publication Data
US 2021/0375033 A1    Dec. 2, 2021

Related U.S. Application Data

(60) Provisional application No. 63/030,573, filed on May 27, 2020.

(51) Int. Cl.
| | | |
|---|---|---|
| *G06T 17/05* | (2011.01) | |
| *G06T 17/20* | (2006.01) | |
| *G06T 15/20* | (2011.01) | |

(52) U.S. Cl.
CPC .............. *G06T 17/05* (2013.01); *G06T 15/20* (2013.01); *G06T 17/20* (2013.01)

(58) Field of Classification Search
None
See application file for complete search history.

(56) References Cited

U.S. PATENT DOCUMENTS

| 10,295,435 B1 | 5/2019 | Wu et al. |
| 2013/0155058 A1 | 6/2013 | Golparvar-Fard et al. |
| (Continued) | | |

OTHER PUBLICATIONS

Alex Braun et al: "Combining inverse photogrammetry and BIM for automated labeling of construction site images for machine learning", Jun. 23, 2019, [retrieved: Jul. 30, 2021] Retrieved from https://publications.cms.bgu.tum.de/2019_Autolabels_Braun.pdf.

(Continued)

*Primary Examiner* — Nicholas R Wilson
(74) *Attorney, Agent, or Firm* — M&B IP Analysts, LLC (57) ABSTRACT

Methods and systems for three-dimensional asset modeling. A method includes: initializing a georeferenced data structure for each of a plurality of discrete sub-regions of an asset based on a model representing the asset, wherein the model includes a plurality of points representing features of the asset, wherein each georeferenced data structure includes a subset of the plurality of points representing features of a respective sub-region of the plurality of sub-regions; and populating each georeferenced data structure with input data including three-dimensional (3D) modeling data and nonspatial data, wherein each portion of the input data for a georeferenced data structure is used to populate a respective portion of the georeferenced data structure, wherein the nonspatial data used to populate each georeferenced data structure is organized with respect to geometry of the georeferenced data structure and with respect to time of recording of the nonspatial data.

15 Claims, 7 Drawing Sheets

(56) References Cited

U.S. PATENT DOCUMENTS

| | | | |
|---|---|---|---|
| 2014/0163931 | A1 | 6/2014 | Snyder et al. |
| 2015/0310135 | A1 | 10/2015 | Forsyth et al. |
| 2016/0350907 | A1 | 12/2016 | Simula et al. |
| 2017/0277761 | A1 | 9/2017 | Bentley et al. |
| 2018/0012125 | A1 | 1/2018 | Ladha et al. |
| 2018/0170540 | A1 | 6/2018 | Claybrough |
| 2018/0336652 | A1 | 11/2018 | Wani et al. |
| 2019/0017911 | A1 | 1/2019 | Kiranyaz et al. |
| 2019/0035165 | A1 | 1/2019 | Gausebeck |
| 2019/0079958 | A1 | 3/2019 | Bentley et al. |
| 2019/0096135 | A1 | 3/2019 | Mutto et al. |

OTHER PUBLICATIONS

International Search Report and Written Opinion of International Searching Authority for PCT/IB2021/054436, ISA/RU, Moscow, Russia, dated Aug. 9, 2021.

Junjie Chen et al. Registering georeferenced photos to a building information model to extract structures of interest, Advanced Engineering Informatics, Jun. 12, 2019, §2.1, §2.3, §3.1, fig. 1 https://www.sciencedirect.com/science/article/abs/pii/S147403461930028X.

The International Search Report and The Written Opinion of the International Searching Authority for PCT/US2020/031569, dated Sep. 10, 2020, ISA/RU, Moscow, Russia.

TECHNIQUES FOR CREATING, ORGANIZING, INTEGRATING, AND USING GEOREFERENCED DATA STRUCTURES FOR CIVIL INFRASTRUCTURE ASSET MANAGEMENT

CROSS-REFERENCE TO RELATED APPLIATIONS

This application claims the benefit of U.S. Provisional Application No. 63/030,573 filed on May 27, 2020, the contents of which are hereby incorporated by reference.

TECHNICAL FIELD

The present disclosure relates generally to three-dimensional modeling of civil infrastructure, and more specifically to semantically labeling infrastructure.

BACKGROUND

Accurate and rapid assessment of the condition of in-service structural systems is critical for ensuring safety and serviceability. To this end, such structural systems are visually inspected to monitor condition over time.

Developments in the fields of remote sensing, robotics, nondestructive testing, sensors, and image capturing technologies provide an opportunity to collect large amounts of visual data such as images, videos, and three-dimensional (3D) imaging (also known as 3D point clouds or 3D meshes) along with non-visual data (e.g., field notes, sensor data, etc.) related to civil infrastructure that may be used to evaluate the condition of such systems. However, such a large amount disparate sources of data is not feasible to analyze and manipulate manually.

Some automated solutions exist. However, the existing solutions for visual data typically use two-dimensional images that have a narrow field and are often high-resolution close-ups of the structure. These images are fundamentally decontextualized since they do not consider the information in the context of the structure the way a human observer in the field intuitively does. In addition, a large amount of non-visual rich information on condition descriptors for infrastructure systems are underutilized, or are misunderstood due to a lack of comprehensive, correlated, and well-organized data structures. This results in an inability to integrate, fuse, georeference, analyze, and visualize these heterogeneous data sources.

As the amount of visual data increases, solutions for effectively storing that visual data become more important. Likewise, more related non-visual data is being collected. For example, such non-visual data may include annotations and measurements for items shown in visual content. Existing solutions face challenges in organizing the non-visual data appropriately.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for three-dimensional asset modeling. The method comprises: initializing a georeferenced data structure for each of a plurality of discrete sub-regions of an asset based on a model representing the asset, wherein the model includes a plurality of points representing features of the asset, wherein each georeferenced data structure includes a subset of the plurality of points representing features of a respective sub-region of the plurality of sub-regions; and populating each georeferenced data structure with input data including three-dimensional (3D) modeling data and nonspatial data, wherein each portion of the input data for a georeferenced data structure is used to populate a respective portion of the georeferenced data structure, wherein the nonspatial data used to populate each georeferenced data structure is organized with respect to geometry of the georeferenced data structure and with respect to time of recording of the nonspatial data.

Certain embodiments disclosed herein also include a non-transitory computer readable medium having stored thereon causing a processing circuitry to execute a process, the process comprising: initializing a georeferenced data structure for each of a plurality of discrete sub-regions of an asset based on a model representing the asset, wherein the model includes a plurality of points representing features of the asset, wherein each georeferenced data structure includes a subset of the plurality of points representing features of a respective sub-region of the plurality of sub-regions; and populating each georeferenced data structure with input data including three-dimensional (3D) modeling data and nonspatial data, wherein each portion of the input data for a georeferenced data structure is used to populate a respective portion of the georeferenced data structure, wherein the nonspatial data used to populate each georeferenced data structure is organized with respect to geometry of the georeferenced data structure and with respect to time of recording of the nonspatial data.

Certain embodiments disclosed herein also include a system for three-dimensional asset modeling. The system comprises: a processing circuitry; and a memory, the memory containing instructions that, when executed by the processing circuitry, configure the system to: initialize a georeferenced data structure for each of a plurality of discrete sub-regions of an asset based on a model representing the asset, wherein the model includes a plurality of points representing features of the asset, wherein each georeferenced data structure includes a subset of the plurality of points representing features of a respective sub-region of the plurality of sub-regions; and populate each georeferenced data structure with input data including three-dimensional (3D) modeling data and nonspatial data, wherein each portion of the input data for a georeferenced data structure is used to populate a respective portion of the georeferenced data structure, wherein the nonspatial data used to populate each georeferenced data structure is organized with respect to geometry of the georeferenced data structure and with respect to time of recording of the nonspatial data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that, in order to effectively monitor temporal changes in infrastructure models over time, a data structure capable of organizing and visualizing heterogenous historical data for the 3D model is required. To this end, the disclosed embodiments include techniques for generating and manipulating georeferenced data structures. The georeferenced data structures store 3D modeling data as well as annotation or other supplemental data, and are readily capable of being expanded as additional historical 3D modeling data and supplemental data are acquired through model updates, for example, each time the subject of the 3D model is scanned. More specifically, the disclosed embodiments provide techniques for adapting the semantically labeled models to changes in required resolution and organizing the data in a manner that enables the analysis of historical data within a spatial context.

The disclosed georeferenced data structure is an organized data structure that enables new kinds of data fusion, enables visualization, and speeds up computation and rendering. The georeferenced data structure stores historical data related to a real-world structure of an asset.

In an example implementation, the asset is a real-world three-dimensional item (3D) represented by a 3D model in a 3D bounding space which is discretized into multiple discrete sub-regions. Such a real-world 3D item may be, but is not limited to, pixels in 2D images or points or meshes in 3D model. In some example implementations, each georeferenced data structure consists of points which represent the outer surface of a respective portion of the asset. In such an example, the points of each georeferenced data structure which represent the outer surface of respective portions of the asset may further store data indicating information about interior features of the respective portion of the asset. In other example implementations, each georeferenced data structure may be a mesh including both points representing the outer surface of the respective portion of the asset and points representing interior components of the respective portion of the asset.

A georeferenced data structure is generated for each sub-region. Each georeferenced data structure is initialized with a size according to an expected resolution required for the sub-region and is expanded over the lifecycle of the asset to accommodate additional historical data of its respective sub-region.

In an embodiment, a 3D model is generated for the asset multiple times (for example, at periodic intervals). The 3D model may be, but is not limited to, a 3D point cloud or a 3D surface (e.g., triangulated surface mesh). 3D model includes points in forms such as, but not limited to, points of a 3D point cloud, vertices of a triangulated surface mesh, and the like. In various embodiments, the 3D model is unfurled to create multiple preferred 2D viewpoints that collectively represent the features of the 3D model. The 2D viewpoints are georeferenced with respect to a 3D coordinate system and analyzed to detect anomalies therein, which in turn can be used for semantic labeling of the georeferenced data structures and, consequently, for generating interface displays showing those anomalies based on the georeferenced data structures.

The 3D model may be generated via scanning of the asset using technologies such as, but not limited to, laser scanning and photogrammetric methods. It should be noted that a 3D point cloud of the infrastructure can be represented as a 3D surface defined by a triangulated surface mesh and vertices. In such a case, the vertices of the mesh serve as georeferenced points. Each point in the point cloud or vertex in 3D mesh surface has respective 3D modeling data (e.g., spatial data, colorimetric data, or both). The data of each point or vertex is stored in a container data structure of the appropriate sub-region of the asset (i.e., the sub-region including the part of the asset represented by the point or vertex). To this end, the georeferenced data structure of each sub-region may store a single point or vertex, multiple points or vertices, or no points or vertices for a given interval.

The supplemental data included in each georeferenced data structure includes nonspatial data related to, for example, asset integrity and performance. Non-limiting examples for such nonspatial data include text annotations, textual records, sensor recording logs, scanning data, measurement data, and the like. The supplemental data is organized both geometrically (with respect to geometry of the respective georeferenced data structure such as with respect to the points or vertices) and historically (with respect to time of recording or capturing, for example based on ordered intervals of data capture). This organization provides a unique structural relationship between historical records of the asset that allows for analyzing historical data within a spatial context. It also enables unique forms of data fusion and integrated data analysis.

The georeferenced data structure may be utilized to enable structured time history visualizations and prognostic visualizations that cannot be accomplished using existing 3D point cloud and 3D surface data formats. Additionally, the supplemental data may be utilized in conjunction with the 3D modeling data to provide intuitive representations of the life-cycle behavior of an asset.

The georeferenced data structure may also be utilized to more efficiently perform analysis of supplemental data. More specifically, the organization of the supplemental data with respect to 3D spatial context allows for predictive or prognostic trend analysis requiring fewer comparisons and, therefore, less computing resources to achieve.

The georeferenced data structure may also be utilized to more efficiently provide visualizations of heterogenous historical data. To this end, various disclosed embodiments also include techniques for displaying semantically labeled infrastructure models to accurately reflect the state of the infrastructure.

Further embodiments provide techniques for providing augmented reality interfaces using portions of the semantically labeled infrastructure models as overlays on top of images of the actual infrastructure, thereby further improving visualization.

Figure 1:
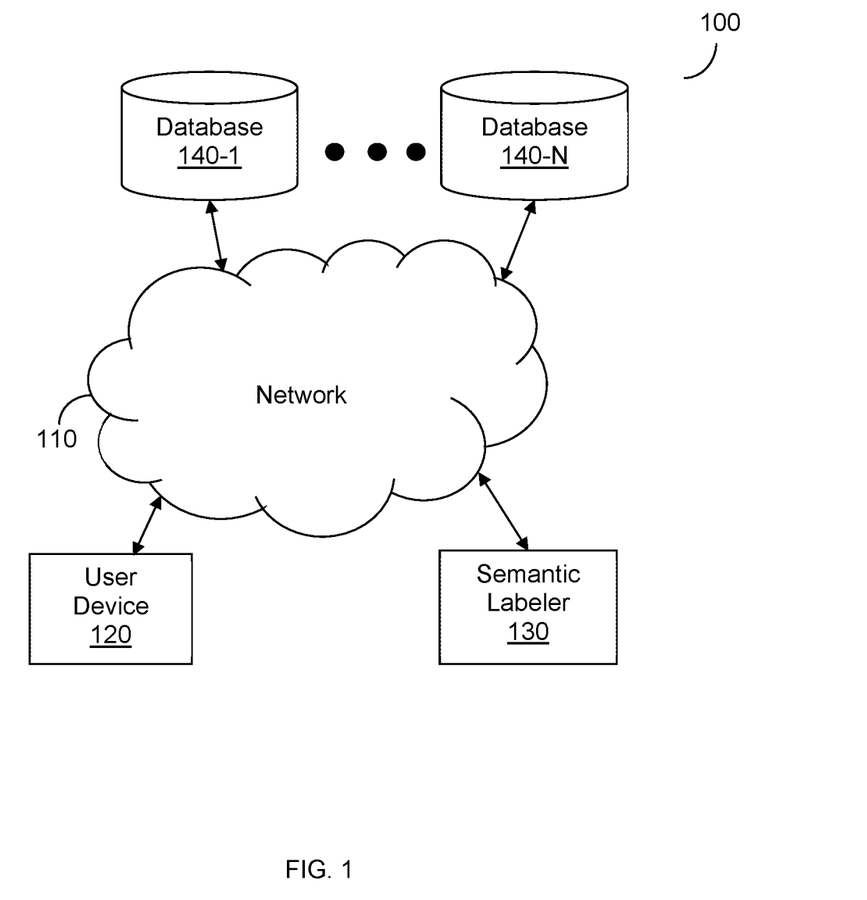
FIG. 1 is a network diagram utilized to describe various disclosed embodiments.

FIG. 1 shows an example network diagram 100 utilized to describe the various disclosed embodiments. In the example network diagram 100, a user device 120, a georeferencer 130, and a plurality of databases 140-1 through 140-N (hereinafter referred to individually as a database 140 and collectively as databases 140, merely for simplicity purposes) are communicatively connected via a network 110. The network 110 may be, but is not limited to, a wireless, cellular, or wired network; a local area network (LAN); a wide area network (WAN); a metro area network (MAN); the Internet; the worldwide web (WWW); similar networks; and any combination thereof.

The user device (UD) 120 may be, but is not limited to, a personal computer, a laptop, a tablet computer, a smartphone, a wearable computing device, or any other device capable of receiving and displaying data including, for example, computer-generated models.

The databases 140 may store visual multimedia content (e.g., images), computer generated models, digital twins, or a combination thereof. The visual multimedia content stored by the databases 140 may include visual multimedia content showing infrastructure system that is to be analyzed by the georeferencer 130, enhanced visual multimedia content showing visually distinguishing projections of defect patterns on infrastructure that are generated by the georeferencer 130, or both. The visual multimedia content to be analyzed stored in the databases 140 may include images, videos, or both, captured by, for example, digital cameras, camcorders, smartphones, tablets, camera-mounted unmanned aerial vehicles (UAVs) such as drones, camera-mounted vehicles, laser scanners, robots (e.g., ground-based, crawling, or climbing robots), camera-mounted unmanned marine vehicles (UMVs), combinations thereof, and the like.

The three-dimensional virtual models may be modified models created by the georeferencer 130 including visually distinguishing projections of defect patterns on infrastructure, three-dimensional virtual models to be modified by the georeferencer 130, or both. In an example implementation, these three-dimensional virtual models are three-dimensional (3D) models of infrastructure shown in visual multimedia content. As a non-limiting example, one such 3D model may be a 3D model of a column that is shown in images of a building.

In an embodiment, the 3D models include semantically labeled models as discussed herein. The semantically labeled models include data used for 3D modeling as well as supplemental data (e.g., annotations indicating information such as measurements). The 3D modeling data and supplemental data include heterogenous historical data organized with respect to time. The organization of the historical data with respect to time allows for accelerating computation and rendering of the 3D model in response to requests from users to display historical views of the structures represented by the semantically labeled model. In addition, by having the data in an organized way it is possible to efficiently and effectively analyze temporal changes in time to assess how infrastructure is decaying.

The 3D modeling data includes data representative of infrastructure such as, but not limited to, position data, color data, and the like. The 3D modeling data may further include projections represented such that they are visually distinct from the infrastructure, for example, using visually distinct colors. As a non-limiting example, if the infrastructure is made of grey concrete, cracks in the concrete may be colored blue or green.

The georeferencer 130 may be configured to identify defects shown in visual multimedia content of infrastructure as described herein and further described in U.S. patent application Ser. No. 16/867,728, the contents of which are hereby incorporated by reference. The georeferencer 130 is configured to obtain the visual multimedia content showing the infrastructure or portions thereof, for example by retrieving such visual multimedia content from one of the databases 140. The visual multimedia content may include, but is not limited to, two-dimensional or three-dimensional images or video (or portions thereof) showing the infrastructure.

In various implementations, the georeferencer 130 may be deployed in a cloud computing platform (not shown). Non-limiting examples for such cloud computing platforms include Amazon® Web Services, Microsoft® Azure, IBM® cloud, and the like. To this end, the georeferencer 130 may be realized as, for example, hardware (e.g., a server), software (e.g., a program installed on a server used to host cloud computing services), or a combination thereof.

It should be noted that the network diagram 100 is utilized to describe various embodiments merely for example purposes and that the disclosed embodiments are not limited to the particular network environment shown in FIG. 1.

Figure 2:
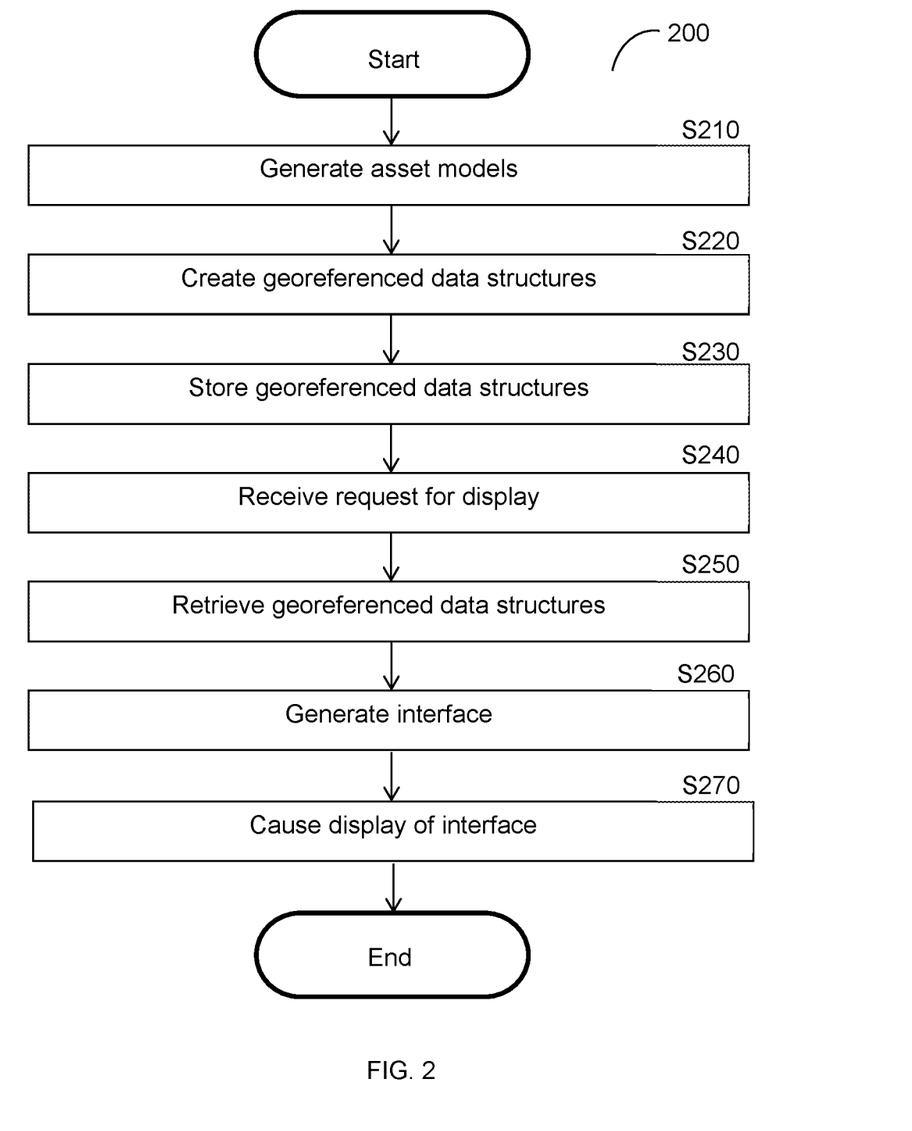
FIG. 2 is a flowchart illustrating a method for generating an interface using georeferenced data structures according to an embodiment.

FIG. 2 is an example flowchart 200 illustrating a method for generating an interface using georeferenced data structures according to an embodiment. In an embodiment, the method is performed by the georeferencer 130.

At optional S210, models of assets are generated. In an embodiment, each model is a 3D point cloud including a field of 3D spatial points representing the asset or a 3D surface including vertices connected by edges and faces. In an example implementation, the asset is at least a portion of infrastructure such as, but not limited to, a building, road, bridge, dam, levee, water or sewage system, railway, subway, airport, harbor, electrical grids, telecommunications equipment, a portion thereof, and the like. Example portions include, but are not limited to, pipes, sections of road, beams, columns, girders, decks, ceilings, floors, roofs, vents, fans, tracks, poles, wires, channels, ramps, abutments, arches, other support structures, and the like.

In an embodiment, generating each 3D model includes generating a point cloud or 3D meshed surface for the asset based on asset geometry and color data (for example, data obtained via regular scanning of the asset or using photogrammetric methods). Multiple models of the asset may be generated, for example, at periodic or other intervals. In an example implementation, a model is generated each time a new scan of the asset is performed (i.e., when new data that may be used to determine shape and color of portions of the asset is obtained). Over time, the model of the asset may change due to changes in the asset. For example, damage to a column may result in chunks of the column being missing, which is then reflected in models created during subsequent scans.

In an embodiment, S210 further includes visually identifying defects in infrastructure and utilizing the visually identified defects to semantically label a model including the defective infrastructure. In an example implementation, the defects may be identified as discussed further below with respect to FIG. 4 as well as in U.S. patent application Ser. No. 16/867,728, the contents of which are hereby incorporated by reference.

At S220, a georeferenced data structure is created for each of one or more sub-regions of an asset based on the models and supplemental data related to the models. The supplemental data may include nonspatial data related to, for example, asset integrity and performance. Non-limiting examples for such nonspatial data include text annotations, textual records, sensor recording logs, scanning data, measurement data, and the like. The format and input for this data sources can be, but not limiting to, Open Database Connectivity (ODBC)/Structured Query Language (SQL) and PI/Open Platform Communications (OPC) database connections, customizable text (ASCII) and CSV file imports (such as .DAT files and many Inclinometer/SAA file formats) along with Python and Visual Basic (VB) scripting. Creating georeferenced data structures is described further with respect to FIG. 3.

Figure 3:
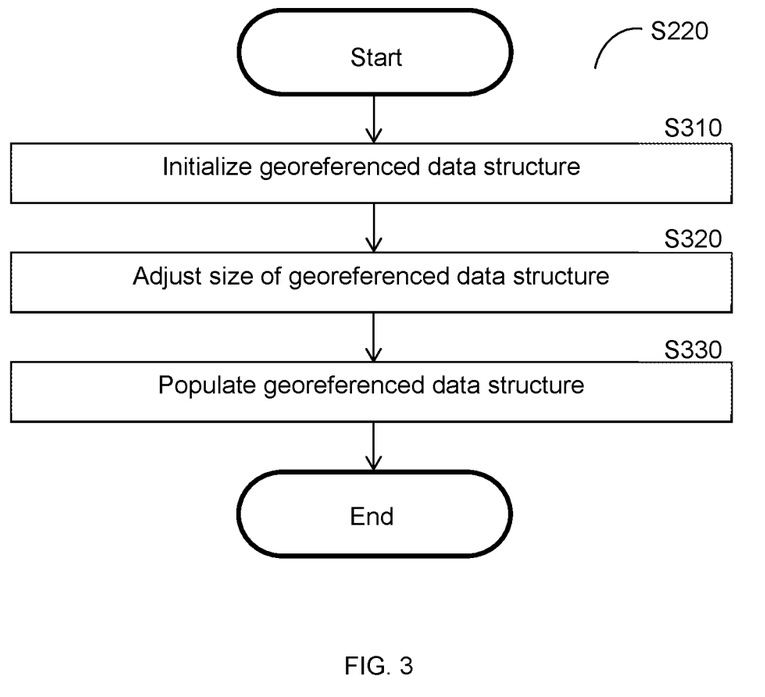
FIG. 3 is a flowchart illustrating a method for creating a georeferenced data structure according to an embodiment.

FIG. 3 is an example flowchart S220 illustrating a method for creating a georeferenced data structure according to an embodiment.

At optional S310, a georeferenced data structure is initialized for each discrete sub-region of the asset to be represented. The sub-regions may be defined, for example, with respect to groupings of points of the point cloud or vertices of the 3D triangulated mesh surface.

The georeferenced data structure includes spatial data and nonspatial supplemental data and is organized with respect to time. To this end, the georeferenced data structure may include fields corresponding to each of the spatial data and nonspatial supplemental data for each temporal variation of the asset. In an example implementation, the georeferenced data structure includes an object for each temporal variation, with each object including the spatial and nonspatial data fields. Each of the spatial data fields and the nonspatial data fields may include multiple fields (e.g., for storing different types of spatial and supplemental data), and may be tagged as either spatial or nonspatial for purposes of identifying relevant data during data extraction in order to improve efficiency of extraction to seamlessly provide actionable information.

At optional S320, the size of the georeferenced data structure is adjusted to accommodate changes in the amount of data. At any given iteration of the method of FIG. 3, if the georeferenced data structure was initialized at S310, the adjustment is not required. That is, when the georeferenced data structure is initially populated (i.e., populated immediately after initialization), such size adjustment may not be needed since the size of the georeferenced data structure is likely initialized correctly for the required use. However, when subsequently populating an existing georeferenced data structure, size adjustment may be required in order to accommodate more data being stored therein.

In an embodiment, adjusting the size of the georeferenced data structure may include, but is not limited to, adjusting a storage size, adjusting a geometry size, or both. The storage size represents the amount of data permitted to be stored in the georeferenced data structure. The geometry size represents the size of underlying portion of the asset represented by the georeferenced data structure with respect to some 3D coordinate system. Adjusting the geometry size may include, but is not limited to, adding points to the georeferenced data structure, adding dimensions to the georeferenced data structure (e.g., by adding a set of cells representing a new type of data related to the added dimension), both, and the like. Adjusting the geometry size will affect the amount of data needed to be stored for the georeferenced data structure and, consequently, will also cause the storage size to be adjusted.

In an embodiment, the size of the georeferenced data structure is adjusted based on an amount of data to be added to the geometric data structure. As a non-limiting example, the amount of data to be added to the geometric data structure may be based on a number of points in a point cloud created during a scan and an amount of sensor data collected during a time interval leading up to the scan. As another non-limiting example, the amount of data to be added to the geometric data structure may be based on a number of vertices, edges, faces, or a combination thereof, defining a surface mesh created during a scan and an amount of sensor data collected during a time interval leading up to the scan.

Alternatively or collectively, the size of the georeferenced data structure may be adjusted based on an expected amount of data to be added to the geometric data structure. The expected amount of data may be based on, for example, previous amounts of data added during historical time intervals.

In an embodiment, S320 may include selectively adjusting sizes of portions of the georeferenced data structure. As a non-limiting example, sizes of fields including 3D modeling data and sensor data, respectively, may be increased based on the amount of new 3D modeling data and sensor data collected during the most recent time interval prior to updating of the georeferenced data structure.

At S330, the georeferenced data structure is populated with input data including 3D modeling (spatial) data and supplemental (nonspatial) data. Each portion of the data is used to populate a respective portion of the data structure (e.g., a respective object, field, and the like).

In an embodiment, S330 includes georeferencing the input data with respect to the georeferenced data structure. In this regard, it is noted that each georeferenced data structure is a 3D data structure containing data indicating its location within a 3D coordinate system. The 3D coordinate system may be, but is not limited to, a geographic coordinate system. In order to associate any given input data to a particular 3D data structure, the input data is georeferenced with respect to the 3D coordinate system. To this end, each portion of input data has respective coordinates corresponding to a location within the 3D coordinate system. The coordinates may be, but are not limited to, determined based on user inputs.

Based on the respective coordinates for each portion of the input data, each portion of the input data is matched to a corresponding portion of a georeferenced data structure. Such matching may include, but is not limited to, a 3D Euclidean distance computation which results in identification of the nearest georeferenced data structure within the 3D coordinate system. Once a portion of the input data has been matched to a respective georeferenced data structure, that portion of the input data is stored as a component of the georeferenced data structure.

In some embodiments, the georeferenced data structures consist of 3D points along the outer surface of assets they represent such that the georeferenced data structures effectively exist on the surface of the assets relative to the 3D coordinate system and do not occupy the entire volume (i.e., including interior portions) of the assets. Accordingly, in such an implementation, the portions of the input data stored as components of the georeferenced data structure manifest on the surface of the underlying asset they represent when the georeferenced data structures are displayed via an interface. The 3D points along the outer surface of the asset of each georeferenced data structure may store interior feature data indicating information about interior features of the respective sub-region of the asset represented by the georeferenced data structure.

Returning to FIG. 2, at S230, the georeferenced data structures are stored in a database.

At S240, a request to display a visual representation of at least a portion of the asset is received. The request may indicate the portion of the asset to be visually represented. The requested portion may be identified based on, for example, particular points or groupings of points of a point cloud, vertices of a surface mesh, sub-regions of the asset, and the like.

The request may further indicate one or more temporal variations of the asset, one or more categories of supplemental data, or both, to be included in the visual representation of the asset.

At S250, the georeferenced data structures for the requested portions of the asset are retrieved from the database. In an embodiment, S250 includes retrieving the georeferenced data structure for each sub-region of the asset corresponding to the requested portions of the asset.

At S260, an interface is generated based on the georeferenced data structure. In an embodiment, the interface is a graphical user interface (GUI) for displaying a visual representation of the asset based on the 3D modeling data and supplemental data of the georeferenced data structure. The GUI allows for interacting with the georeferenced data structure.

In an embodiment, the interface is further generated based on the requested temporal variations. To this end, modeling and supplemental data is extracted from the portions of the georeferenced data structure related to the requested temporal variations. Because the georeferenced data structure is organized with respect to times, extracting requires consuming fewer computing resources and rendering is sped up.

Figure 5:
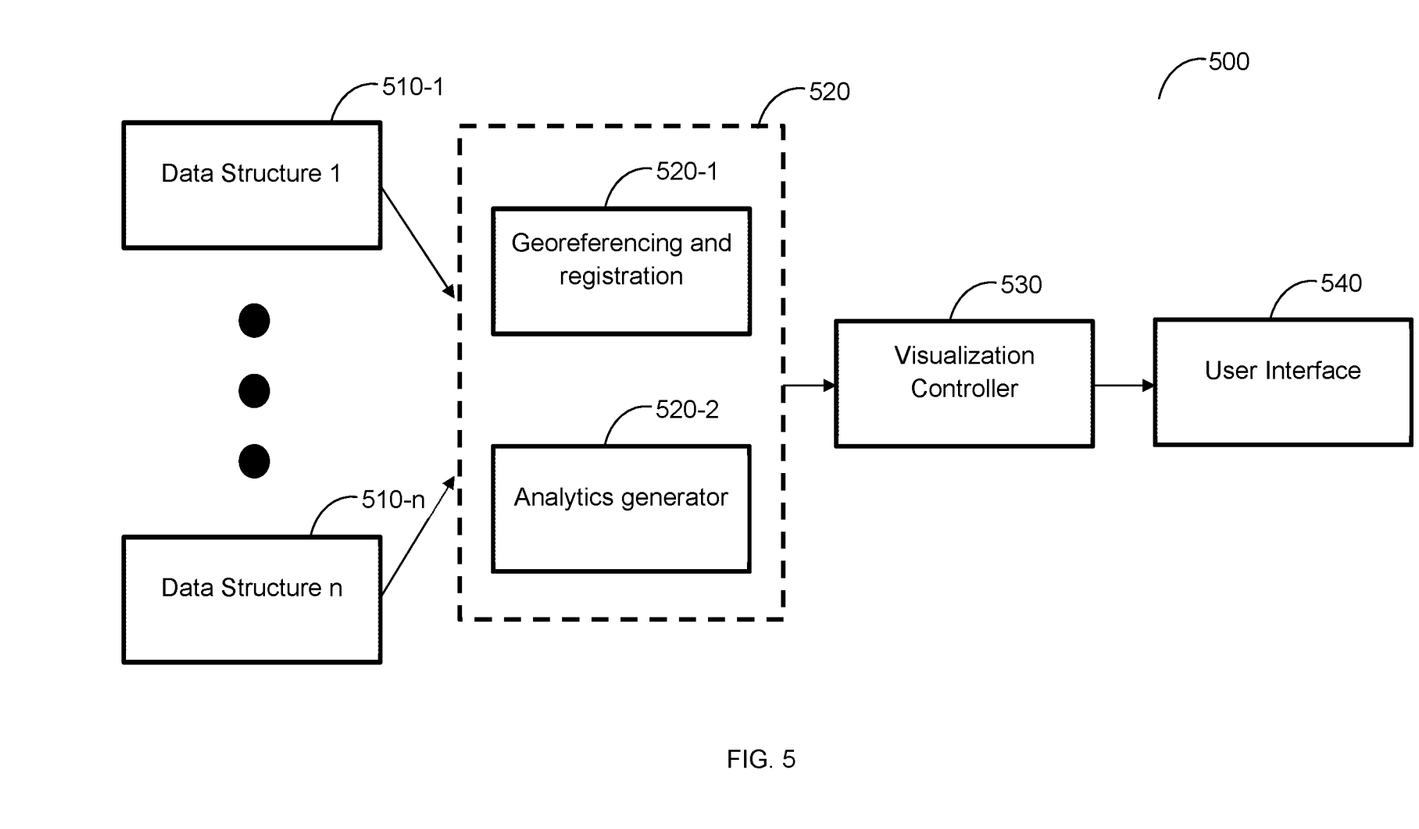
FIG. 5 is a flow diagram illustrating utilization of a georeferenced data structure according to an embodiment.

In an embodiment, the interface is generated using the georeferenced data structures. The generation of the interface may be performed by a visualization controller, and may further include generating analytics. FIG. 5 is an example flow diagram illustrating the flow of data used for generating the interface.

In FIG. 5, georeferenced data structures 510-1 through 510-$n$ are utilized in order to generate the interface. The georeferenced data structures 510 include 3D modeling data and supplemental data, and are structured as described herein. The georeferenced data structures 510 are analyzed by an analyzer 520.

In an embodiment, the analyzer 520 includes a georeferencing and registration component 520-1 and an analytics generator component 520-2. The georeferencing and registration component 520-1 is a logical component configured to georeference each georeferenced data structure 510 by determining a location of each georeferenced data structure 510 with respect to a 3D coordinate system and to register each georeferenced data structure 510 based on its determined location with respect to the 3D coordinate system. The analytics generator component 520-2 is configured to analyze the georeferenced data structures 510 in order to, for example, generate analytics such as predictive analytics based on historical trend analysis of the georeferenced data structures and analytics demonstrating changes in an asset over time.

The output of the analyzer 520 is input to a visualization controller 530. The visualization controller is configured to map data of the georeferenced data structures 510 to a 3D visualization model such as a 3D point cloud or 3D triangulated surface of an asset for rendering and to render the data of the georeferenced data structures 510 for display via the user interface 540. The user interface 540 displays the rendered data and may be, for example, a graphical user interface.

Returning to FIG. 2, at S270, the interface is caused to be displayed to a user. In an embodiment, S270 includes sending the interface to, for example, one of the user devices 120. In another embodiment, S270 includes rendering and displaying the interface.

It should be noted that the method of FIG. 2 is described from the perspective of a single system for simplicity purposes but that, in some implementations, a portion of the method may be performed by a different system. As a particular example, defect identification may be performed by a defect identifier as discussed further in U.S. patent application Ser. No. 16/867,728, the contents of which are hereby incorporated by reference. As other non-limiting examples, defects or other anomalies may be identified based on user inputs with respect to a 3D model of the asset (e.g., based on comments or other textual inputs indicating anomalies in points of a 3D model), based on sensory signals captured with respect to the asset (e.g., micro-electromechanical systems sensors), both, and the like. Thus, in such an implementation, the results of the defect identification may be stored and subsequently accessed by the georeferencer 130.

Figure 4:
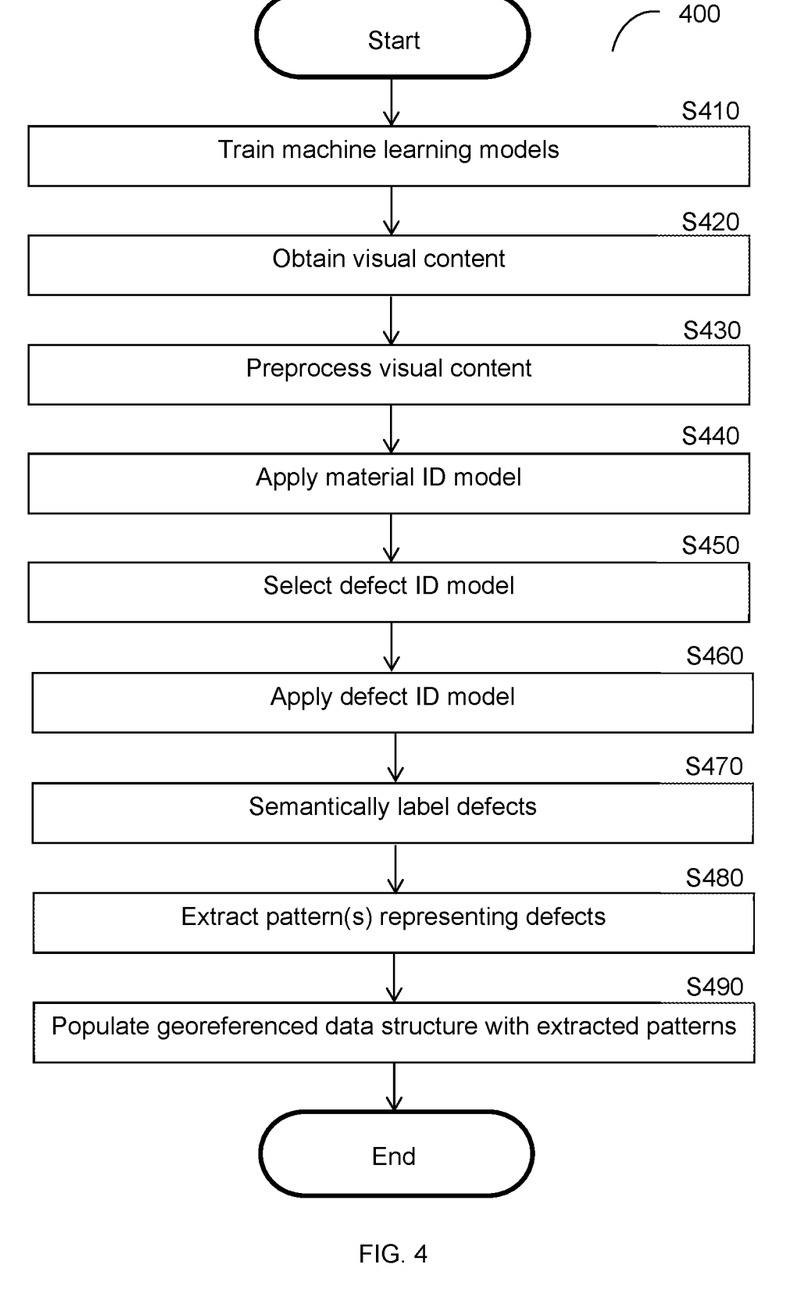
FIG. 4 is a flowchart illustrating a method for visual identification of defects in infrastructure using machine learning.

FIG. 4 is an example flowchart 400 illustrating a method for visual identification of defects in infrastructure using machine learning according to an embodiment. The method is performed with respect to visual multimedia content such as, but not limited to, images, videos, 3D models, or other content showing or representing portions of infrastructure. In an embodiment, the method is performed by the georeferencer 130, FIG. 1.

At S410, machine learning models to be used for identifying anomalies of infrastructure shown in images are trained. The trained models include a material identification (ID) model and multiple anomaly identification (ID) models. The material identification model is trained to identify a type of material that a portion of infrastructure is made of when applied to images showing the portion of infrastructure. Each anomaly identification model is trained to identify one or more anomalies in a portion of infrastructure made of a type of material (e.g., concrete, steel, etc.) when applied to images showing portions of infrastructure made of that type of material. Different anomaly identification models are therefore trained to identify anomalies in portions of infrastructure made from different types of materials. Example training phases are described further in U.S. patent application Ser. No. 16/867,728, the contents of which are hereby incorporated by reference.

At S420, visual content for which anomalies should be identified are obtained. The visual content may be retrieved, for example, from a database (e.g., one of the databases 140, FIG. 1). The images may include, but are not limited to, images, videos, and the like, showing one or more portions of infrastructure.

At optional S430, the images may be preprocessed.

In an embodiment, S430 may include, but is not limited to, removing blurry, noisy, zoomed out, or distorted images. Removing zoomed out images contributes to more accurate identification of anomalies by increasing the likelihood that each distinct portion of the image represents either an anomaly or a lack thereof (e.g., that a pixel does not show both a defected part and non-defective part of the portion of infrastructure). Additionally, removing zoomed out images reduces the likelihood that multiple materials are captured in the same image when the material identification model is only trained to identify a single type of material per image. This, in turn, results in more accurate selection of an anomaly identification model.

In another embodiment, S430 may include unfurling a 3D model in order to create preferred 2D viewpoints. In such an embodiment, the unfurling includes generating multiple 2D viewpoints based on visual multimedia content including a 3D model by projecting a desired perspective of the 3D model onto the corresponding image plane (i.e., rendering). In such an embodiment, the generated viewpoints are used as visual multimedia content for subsequent processing instead of the original 3D model. In a further embodiment, generating the multiple 2D viewpoints includes loading the 3D model in a 3D model viewer and generating multiple sets of camera positions, orientations, or combinations thereof. Multiple snapshots may be taken using the multiple sets of camera position and orientation. The camera positions and orientations may be randomly generated or may be generated according to a scheme designed to capture multiple images that are likely to result in meaningful 2D viewpoints for material and damage identification.

More specifically, the camera positions may be generated randomly by randomly selecting sets of center coordinates of the camera within the bounding box of the scene. The sets of center coordinates may include center coordinates having different altitudes. In an example implementation, the view directions are selected in a 30 to 45-degree cone oriented with respect to the ground. To ensure meaningful viewpoints, in an example implementation, at least 20% of the pixels of the viewpoints should correspond to points of the 3D model (i.e., at least 20% of each viewpoint should show part of the 3D model).

Alternatively, the camera positions may be generated according to a multiscale scheme by selecting a starting point or vertex among the points or vertices of the 3D model. In an example implementation, a line is selected such that the line goes through the point, and multiple (e.g., 3) camera positions are generated that are on the line. Each camera position is associated with an orientation of the camera that faces toward the starting point.

Figure 7:
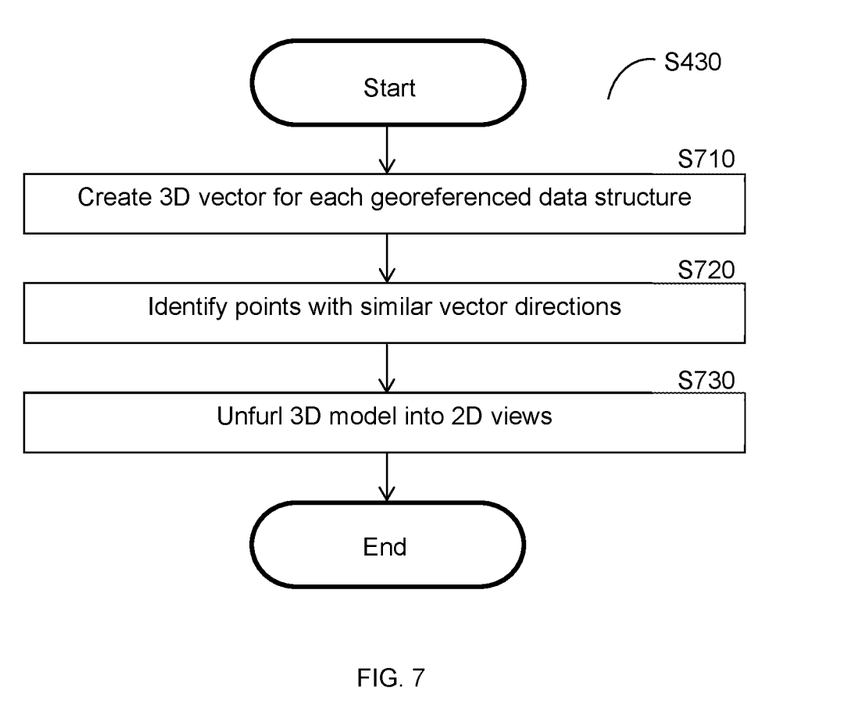
FIG. 7 is a flowchart illustrating a method for unfurling a 3D model according to an embodiment.

In an embodiment, the 3D model may be unfurled in order to create preferred 2D viewpoints as described with respect to FIG. 7. FIG. 7 is a flowchart 700 illustrating a method for unfurling a 3D model to create multiple preferred 2D viewpoints according to an embodiment.

At S710, a 3D vector is created for each of the georeferenced data structures of the 3D model. In an embodiment, each 3D vector points in a direction normal to a surface. The surface is defined by a neighborhood. Each neighborhood includes one of the georeferenced data structures and one or more nearby points, and is computed based on a combined geometry of the georeferenced data structure and the nearest neighboring points. The neighborhood may be defined by one or more neighborhood rules. The neighborhood rules may define nearby points as, for example but not limited to, all points within a predetermined threshold distance of any point in the georeferenced data structure, a threshold number of points having the least distance to any point in the georeferenced data structure, and the like. The neighborhood rules may be, but are not necessarily, defined by a user (e.g., based on user inputs).

At S720, points sharing a similar vector direction to the 3D vectors are identified. This identification of points effectively identifies all points that are considered part of the same surface of an asset and defines the preferred 2D views. A point sharing a similar vector direction to a given 3D vector has a vector direction within a threshold of the vector direction of the 3D vector.

At S730, the 3D model is unfurled based on the identified points in order to create 2D viewpoints. In an embodiment, unfurling the 3D model includes projecting geometry of the 3D vectors onto respective 2D viewpoints. Accordingly, the resulting 2D viewpoints collectively represent the 3D model. In an example implementation where the real world object has a curvilinear geometry, a curvilinear surface of the corresponding data structure can be "unwrapped" by geometrically projecting that 3D surface onto multiple 2D viewpoints.

The 2D viewpoints may be preferred, for example, in the sense that they represent predetermined desirable 2D viewpoints with respect to the type of surface represented by the original 3D model. These desirable 2D viewpoints may be, but are not limited to, 2D viewpoints which are previously known to collectively represent the original 3D model accurately, or may otherwise be 2D viewpoints with respect to particular 3D geometrical shapes selected based on other criteria. To this end, in an embodiment, each preferred 2D viewpoint has a predetermined definition with respect to a respective 3D shape. Different 3D shapes may have different definitions for corresponding 2D viewpoints. As a non-limiting example, a cylindrical shape may have a first set of predetermined definitions for corresponding 2D viewpoints while a rectangular shape has a second, different, set of predetermined definitions for corresponding 2D viewpoints.

Returning to FIG. 4, at S440, the material identification model is applied to the visual multimedia content or features extracted therefrom in order to identify a type of material of the portion of infrastructure shown in the visual multimedia content.

At S450, based on the identified type of material, one of the anomaly identification models is selected. The selected anomaly identification model is trained to identify anomalies in the identified type of material.

In some implementations (not shown), different anomaly identification models may be selected for different portions of the visual multimedia content. This may occur, for example, when different images or viewpoints prominently feature different portions of infrastructure made of different materials. In such an implementation, each selected anomaly identification model may be applied to its respective image or viewpoint.

In a further embodiment, S450 may include cropping or otherwise separating the different portions of the visual multimedia content based on the material identifications and selecting an anomaly identification model for each portion. Each separated portion therefore represents a part of the infrastructure made of a different material.

At S460, the selected anomaly identification model is applied to the visual multimedia content or features extracted therefrom to determine which portions of the visual multimedia content indicate anomalies. More specifically, S460 includes determining which distinct portions (e.g., pixels, areas or vertices of parametric surfaces, points of point clouds, triangles or vertices of surface meshes, etc.)

of the visual multimedia content represent each identified defect. In an example implementation, S460 includes determining, for each pixel in an image, whether and which anomaly is represented by that pixel. In another example implementation, S460 includes determining, for each point or vertex in a 3D model, whether and which anomaly is represented by that point or vertex.

At S470, the visual multimedia content is semantically segmented. The semantically segmented visual multimedia content includes labeled distinct portions (e.g., pixels, 3D model points or vertices, etc.), where each label indicates the anomaly (or lack thereof) determined for its respective distinct portion.

At S480, one or more patterns representing the identified anomalies are extracted from the semantically segmented visual multimedia content.

At S490, a data structure including points or vertices and corresponding georeferenced supplemental data is populated with the extracted patterns. The population may include adding, to the data structure, supplemental data such as, but is not limited to, a quantification of each defect shown in the visual multimedia content, markers that visually distinguish defects from areas of the infrastructure portion that are not defected, or a combination thereof. To this end, S490 may further include determining a value of such quantification.

The quantification may be, for example, a relative size of the anomaly shown in a portion of visual multimedia content (e.g., a portion of an image, viewpoint, or 3D model representing the defect) compared to the size of the entire portion of visual multimedia content (e.g., based on number of pixels representing the anomaly as compared to total number of pixels in the image, based on a number of points or vertices representing the anomaly as compared to total number of points or vertices, respectively, in the 3D model, based on a size of the mesh of the anomaly as compared to the size of the entire 3D model, etc.). The quantification may be, but is not limited to, a relative area, volume, height, width, or other measurement of the defect. As a non-limiting example, the quantification may indicate a relative width of a crack in a column.

The modified visual multimedia content is modified with respect to the portions representing anomalies such that those portions are visually distinct from other portions (i.e., portions that do not represent anomalies). In an example implementation, the modification may include changing the color of the distinct portions representing anomalies using colors that are not distinct from colors of the material shown in the visual multimedia content (e.g., green, red, or blue color may be used to visually distinguish cracks in grey concrete). The visual multimedia content may be further modified such that pixels representing different anomalies are also visually distinct from each other.

Figure 6:
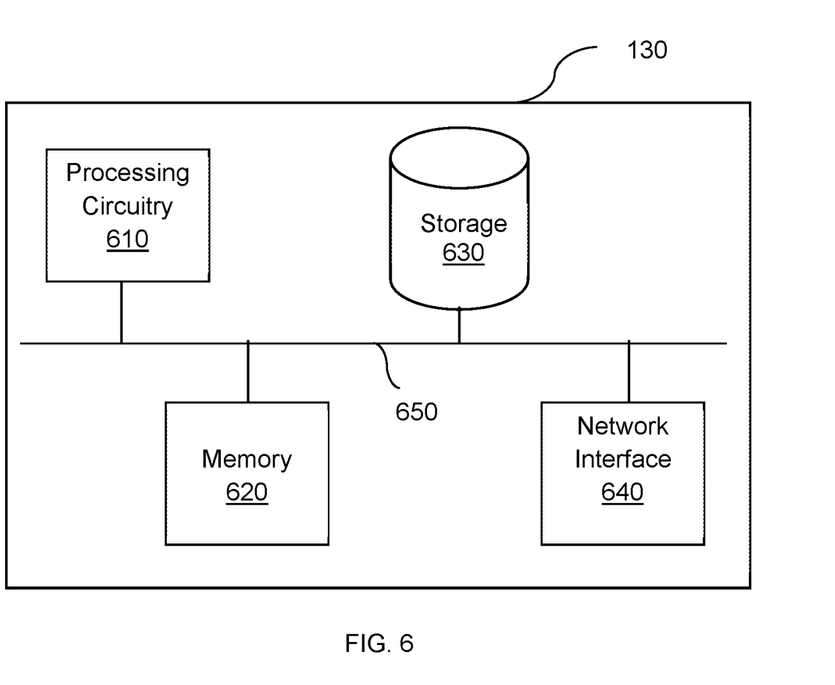
FIG. 6 is a schematic diagram of a georeferencer according to an embodiment.

FIG. 6 is an example schematic diagram of a georeferencer 130 according to an embodiment. The georeferencer 130 includes a processing circuitry 610 coupled to a memory 620, a storage 630, and a network interface 640. In an embodiment, the components of the georeferencer 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the georeferencer 130 to communicate with the databases 140 for the purpose of, for example, storing and retrieving infrastructure models, retrieving visual multimedia content showing portions of infrastructure, and the like. Further, the network interface 640 allows the georeferencer 130 to communicate with the user device 120 for the purpose of sending interfaces for display.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for three-dimensional asset modeling, comprising:
    initializing a first georeferenced data structure of a plurality of georeferenced data structures, wherein each of the plurality of georeferenced data structures is initialized for one of a plurality of discrete sub-regions of an asset based on a model representing the asset, wherein the model includes a plurality of points representing features of the asset, wherein the first georeferenced data structure includes a subset of the plurality of points representing features of a respective sub-region of the plurality of sub-regions;
    creating a 3D vector for the first georeferenced data structure based on a geometry of the first georeferenced data structure;
    identifying, for the 3D vector, at least one point having a vector direction within a threshold of a vector direction of the 3D vector;
    unfurling a 3D model of the asset by creating a plurality of two-dimensional (2D) viewpoints based on the identified at least one point; and
    populating the first georeferenced data structure with input data including three-dimensional (3D) modeling data and nonspatial data, wherein a first portion of the input data for the first georeferenced data is used to populate a respective portion of the first georeferenced data structure, wherein the nonspatial data used to populate the first georeferenced data structure is organized with respect to geometry of the first georeferenced data structure and with respect to time of recording of the nonspatial data, wherein the nonspatial data includes anomaly data indicating at least one anomaly in the asset, wherein the anomaly data is determined based on the 3D model of the asset, wherein the anomaly data is determined based on the plurality of 2D viewpoints.

2. The method of claim 1, wherein unfurling the 3D model further comprises:
    projecting a geometry of each 3D vector onto a respective 2D viewpoint of the plurality of 2D viewpoints.

3. The method of claim 1, wherein each of the plurality of 2D viewpoints has a predetermined definition with respect to a 3D shape.

4. The method of claim 1, wherein the subset of the plurality of points of the first georeferenced data structure consists of a plurality of surface points representing an outer surface of the respective sub-region of the asset, wherein each surface point stores data indicating information about interior features of the respective sub-region of the asset.

5. The method of claim 1, wherein populating the first georeferenced data structure further comprises:
    georeferencing the first portion of the input data with respect to the first georeferenced data structure by matching the first portion of the input data to the respective portion of the first georeferenced data structure based on coordinates for the first portion of the input data, wherein the coordinates of the first portion of the input data correspond to a 3D coordinate system in which a location of the first georeferenced data structure is indicated, wherein the first georeferenced data structure is populated by storing the first portion of the input data in the matching portion of the first georeferenced data structure.

6. The method of claim 1, further comprising:
    adjusting the size of the first georeferenced data structure to accommodate additional input data; and
    populating the first georeferenced data structure with the additional input data.

7. The method of claim 1, further comprising:
    generating an interface for a first georeferenced data structure of the first georeferenced data structures by mapping data stored in the first georeferenced data structure to a 3D visualization model of the asset and rendering the mapped data via a user interface.

8. A non-transitory computer readable medium having stored thereon instructions for causing a processing circuitry to execute a process, the process comprising:
    initializing a first georeferenced data structure of a plurality of georeferenced data structures, wherein each of the plurality of georeferenced data structures is initialized for one of a plurality of discrete sub-regions of an asset based on a model representing the asset, wherein the model includes a plurality of points representing features of the asset, wherein the first georeferenced data structure includes a subset of the plurality of points representing features of a respective sub-region of the plurality of sub-regions;
    creating a 3D vector for the first georeferenced data structure based on a geometry of the first georeferenced data structure;
    identifying, for the 3D vector, at least one point having a vector direction within a threshold of a vector direction of the 3D vector;
    unfurling a 3D model of the asset by creating a plurality of two-dimensional (2D) viewpoints based on the identified at least one point; and
    populating the first georeferenced data structure with input data including three-dimensional (3D) modeling data and nonspatial data, wherein a first portion of the input data for the first georeferenced data is used to populate a respective portion of the first georeferenced data structure, wherein the nonspatial data used to populate the first georeferenced data structure is organized with respect to geometry of the first georeferenced data structure and with respect to time of recording of the nonspatial data, wherein the nonspatial data includes anomaly data indicating at least one anomaly in the asset, wherein the anomaly data is determined based on the 3D model of the asset, wherein the anomaly data is determined based on the plurality of 2D viewpoints.

9. A system for three-dimensional asset modeling, comprising:
a processing circuitry; and
a memory, the memory containing instructions that, when executed by the processing circuitry, configure the system to:
initialize a first georeferenced data structure of a plurality of georeferenced data structures, wherein each of the plurality of georeferenced data structures is initialized for one of a plurality of discrete sub-regions of an asset based on a model representing the asset, wherein the model includes a plurality of points representing features of the asset, wherein the first georeferenced data structure includes a subset of the plurality of points representing features of a respective sub-region of the plurality of sub-regions;
create a 3D vector for the first georeferenced data structure based on a geometry of the first georeferenced data structure;
identify, for the 3D vector, at least one point having a vector direction within a threshold of a vector direction of the 3D vector;
unfurl a 3D model of the asset by creating a plurality of two-dimensional (2D) viewpoints based on the identified at least one point; and
populate the first georeferenced data structure with input data including three-dimensional (3D) modeling data and nonspatial data, wherein a first portion of the input data for the first georeferenced data is used to populate a respective portion of the first georeferenced data structure, wherein the nonspatial data used to populate the first georeferenced data structure is organized with respect to geometry of the first georeferenced data structure and with respect to time of recording of the nonspatial data, wherein the nonspatial data includes anomaly data indicating at least one anomaly in the asset, wherein the anomaly data is determined based on the 3D model of the asset, wherein the anomaly data is determined based on the plurality of 2D viewpoints.

10. The system of claim 9, wherein the system is further configured to:
project a geometry of each 3D vector onto a respective 2D viewpoint of the plurality of 2D viewpoints.

11. The system of claim 9, wherein each of the plurality of 2D viewpoints has a predetermined definition with respect to a 3D shape.

12. The system of claim 9, wherein the subset of the plurality of points of the first georeferenced data structure consists of a plurality of surface points representing an outer surface of the respective sub-region of the asset, wherein each surface point stores data indicating information about interior features of the respective sub-region of the asset.

13. The system of claim 9, wherein the system is further configured to:
georeference the first portion of the input data with respect to the first georeferenced data structure by matching the first portion of the input data to the respective portion of the first georeferenced data structure based on coordinates for the first portion of the input data, wherein the coordinates of the first portion of the input data correspond to a 3D coordinate system in which a location of the first georeferenced data structure is indicated, wherein the first georeferenced data structure is populated by storing the first portion of the input data in the matching portion of the first georeferenced data structure.

14. The system of claim 9, wherein the system is further configured to:
adjust the size of the first georeferenced data structure to accommodate additional input data; and
populate the first georeferenced data structure with the additional input data.

15. The system of claim 9, wherein the system is further configured to:
generate an interface for a first georeferenced data structure of the first georeferenced data structures by mapping data stored in the first georeferenced data structure to a 3D visualization model of the asset and rendering the mapped data via a user interface.

* * * * *